Sept. 7, 1954   C. A. S. THORSTENSSON-RYDBERG   2,688,468
APPARATUS FOR TREATMENT OF CREAM AND MILK Filed Aug. 8, 1947   2 Sheets-Sheet 1

INVENTOR.
CARL A.S. THORSTENSSON-RYDBERG
BY
Campbell, Brumbaugh, Free & Graves
HIS ATTORNEYS.

Sept. 7, 1954 C. A. S. THORSTENSSON-RYDBERG 2,688,468
APPARATUS FOR TREATMENT OF CREAM AND MILK
Filed Aug. 8, 1947 2 Sheets-Sheet 2

INVENTOR.
CARL A.S. THORSTENSSON-RYDBERG
BY
Campbell, Brumbaugh, Free & Graves
HIS ATTORNEYS.

Patented Sept. 7, 1954

2,688,468

UNITED STATES PATENT OFFICE 2,688,468

APPARATUS FOR TREATMENT OF CREAM AND MILK

Carl Anders Sverker Thorstensson-Rydberg, Stockholm, Sweden, assignor to J. R. Andersson & Co. Aktiebolag, Sundbyberg, Sweden Application August 8, 1947, Serial No. 767,472
In Sweden May 6, 1941

Section 1, Public Law 690, August 8, 1946
Patent expires May 6, 1961

3 Claims. (Cl. 259—3)

The present invention relates to an apparatus for the treatment of milk and cream especially in connection with the production of butter, margarine and similar products.

An object of the present invention is to provide a churn for the production of butter and like products comprising a power driven and rotatable container having a closure controlled opening for feeding milk and cream thereto and for dispensing the same or the finished products therefrom by tilting the container at will, said container having a heat exchange compartment formed thereabout whereby during the rotation thereof desired temperatures may be maintained therein for producing the finished products in a more efficient and economical manner with a churn which utilizes a relatively limited amount of space.

The accompanying drawings demonstrate means of carrying out the invention:

Figure 1:
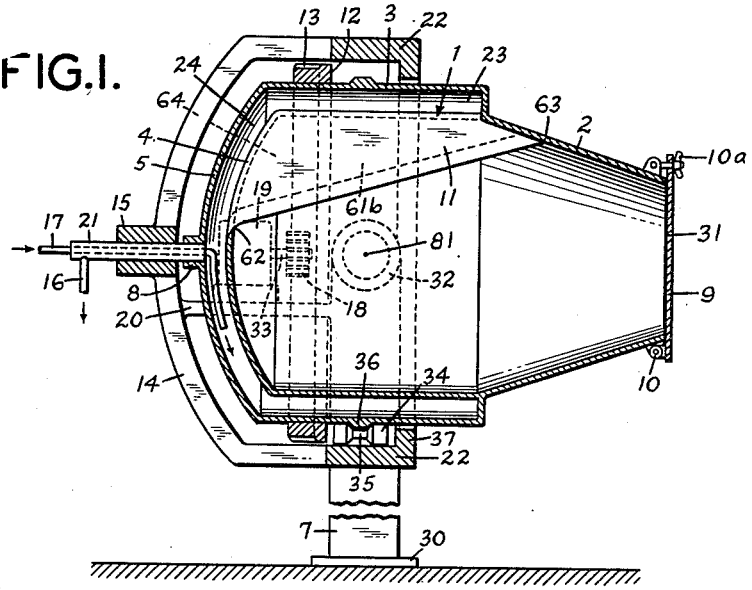
Figs. 1 and 2 show a butter churn with arrangements for cooling and heating the ingredients of the container, Fig. 1 being a section of the container taken longitudinally through a vertical plane of symmetry and Fig. 2 being an end view of the container.
Figure 2:
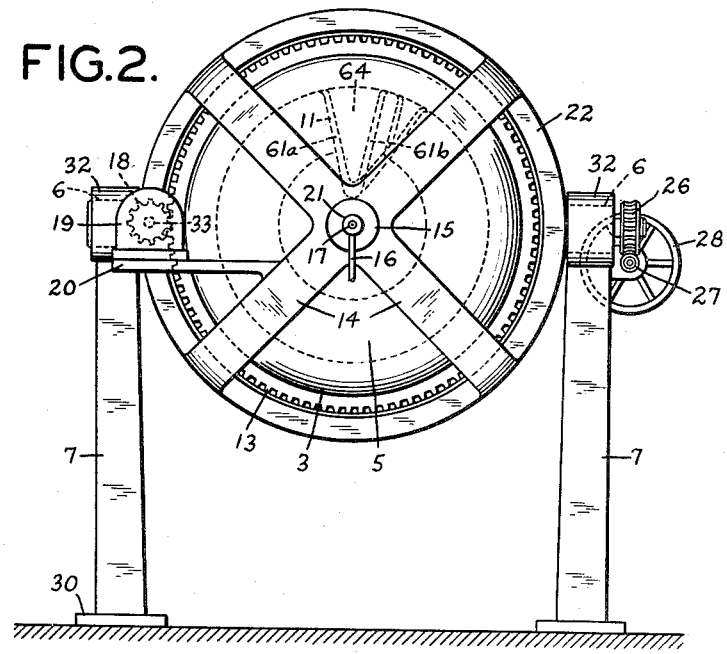

In the drawings, Figs. 1 to 4 inclusive show a butter churn comprising a cylindrical body portion 1 having a dished rear end. Projecting from the front of the body portion 1 is a frustoconical portion or inner wall 2 which ends in a charge- and discharge-opening 31 which in turn is covered by a cover 9 mounted on hinges and adapted to be fastened in closed position by a bolt arrangement 10a. Outside the body walls 1 and 4 is a jacket comprised of walls 3 and 5 arranged at a distance from the former walls in order to provide a heating and cooling space 23, 24. The outer bottom wall 5 is provided with a central nipple 8 through which steam and condensate conduits 17 and 16 are led to mantlespace 24.

These conduits are arranged in a conductor 21 mounted in the central part 15 of a support formed as a cross 14 which is directly attached to a bearing ring 22 which in turn is attached to journals 6 horizontally arranged in bearings 32 which are supported by standards 7 having foot plates 30. The box 21, to which charge conduit 17 and discharge conduit 16 are connected, can be combined with an axial bearing which may be provided with arrangements to take up the axial pressure. Close to ring 12, fixed on mantle wall 3, a cogring 13 is arranged to cooperate with cogwheel 18, placed on a motor shaft 33 of an electric motor 19. This motor is placed on a special bracket 20 which is supported by the bearing ring 22 and the system of cross arms 14.

To one journal 6 is connected a helical wheel 26 which is in contact with a helix 27 which in turn is acted upon by a handwheel 28. By this mechanism the butter churn can be turned in such a way that the opening 31 may be directed upwardly or downwardly for charging the ingredients or for discharging the contents of the container, respectively.

Bearing ring 22 is arranged on the inner side with a bearing surface for rolls 34 which are provided with a central part 35 of smaller diameter than the end portions. By this arrangement a space is left for a guide ring 36 between the rolls 34. The ring 22 is arranged on outer wall 3. The ring 12 and a flange 37 prevent the rolls from shifting laterally.

Figure 3:
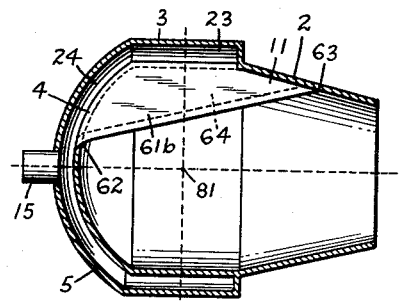
Figs. 3 and 5 show a container in section through the axis of rotation in two different positions.
Figure 7:
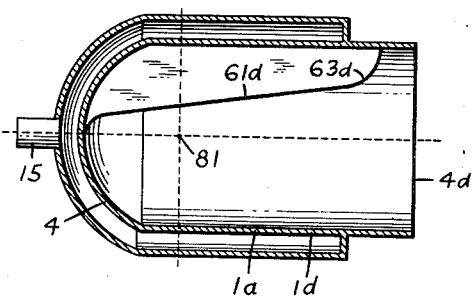
Fig. 7 shows a modification of the invention in which the container is a cylindrical drum.

The drawings in Figs. 3 and 7 show sectional views through the container body and also modifications in the construction of the dasher blade or wing.

Connected through the nipple 8 are the conduit leads 17 and 21 for the inlet and outlet of steam, hot or cold air or water, or other media, which shall circulate in the passageways 23 and 24. The container as well as the surrounding jacket are fixed together for rotation. The container can rotate around its axis and can, together with the jacket, be turned about an axis at the bearing points 81 in order to tip and empty the contents of the container. The container can rotate on its axis of rotation in a horizontal position, or at an angle to the horizontal while inclined upwardly or downwardly.

Figure 5:
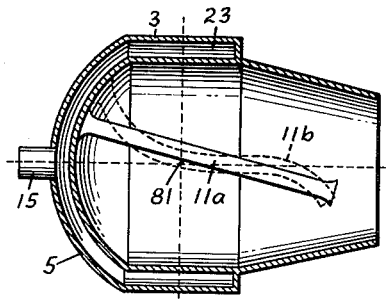
Figure 4:
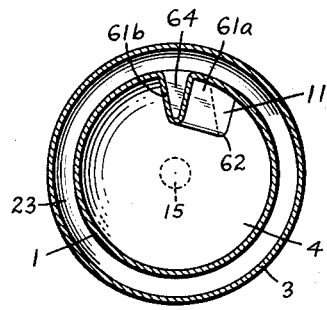
Figs. 4 and 6 are transverse sections of the same container taken in a plane through the axis of rotation.
Figure 6:
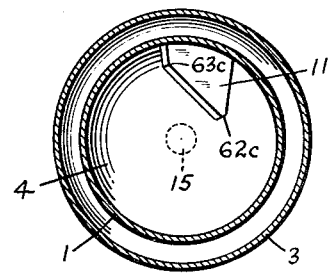

The wing or hollow stirrer 11 is arranged in the container and extends from the closed end 4 at a point 62 near the center of the container to a point 63 a good distance into the conical part 2. The wing decreases in breadth in such a way that it ends in a narrow tip at point 63. As shown in Fig. 4 the stirrer 11 is formed by two triangular parts 61a and 61b which are fastened to container portions 1, 2 and 4 and are projected inwardly therefrom radially of the container in spaced relation to each other. However, the stirrer can be formed in any other way. In the stirrer 11 a passageway 64 is formed which communicates with mantle space 23. In Fig. 5 there is shown a stirrer 11a which is inclined in relation to the direction of the axis of rotation. In this figure there is further shown in dotted lines a modified stirrer 11b formed as a longitudinally extending undulation. This stirrer can be made without a hollow space if desired. In Fig. 6 a wing 11 is shown (with part 62c at the closed end and part 63c in the open end in the container) which consists of one plate and which is used if the heating or cooling medium is not desired to circulate in the wing or stirrer.

Figure 8:
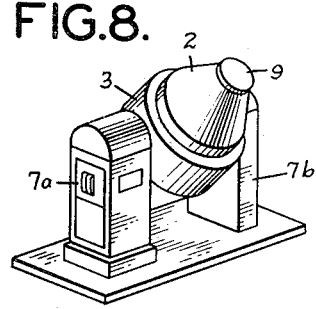
Fig. 8 is a perspective view of the apparatus arranged in an inclined position.

A modification of the container in which the conical body is eliminated and the body of the container is entirely cylindrical and of the same diameter between the wall 4 and the discharge opening 4d, is shown in Fig. 7. The wing 61d does not end in a point but extends some distance into the center of the container to a point 63d. Fig. 8 shows a desirable mode of mounting the churn on supporting columns 7a and 7b, one of which may form a conditioner for the heating and cooling medium supplied to the container.

According to the invention, it is possible to heat the ingredients for ripening as well as to interrupt the ripening by cooling the butter particles in the same container. The cooling prevents the butter particles from adhering to the walls of the container or to the wing. Cooling and heating can be carried out during the working itself. This is very important in order to get a good churning.

The churning procedure using the apparatus described herein is distinguished by the feature that when the procedure commences the drum is standing with its axis vertical and it is not possible to impart any stirring effect to the contents during the rotary movement. The drum is then turned so that its axis forms an angle of 5° to 10° with a vertical line so that a slight stirring effect commences, permitting the acidifying culture to be uniformly distributed in the cream. When the acidification is to be interrupted, the churn is rotated for a few revolutions while it is being cooled in order that the contents shall obtain the same temperature throughout. This cooling is preferably effected by the introduction of some cooling medium into the jacket space but may be accomplished in some other way. The container then is inclined to an angle between 45° and 90° to the vertical line, the magnitude of the angle depending upon the nature of the cream. In this position the drum is rotated at a speed so that the butter forms within the desired time. After the butter is formed, the angle to the vertical line is further increased so that the axis of rotation of the container will form a larger angle than 90° to the vertical line in order to tap the churn milk from the container. This angle may be up to a maximum of 180°. After that the actual working of the butter is effected at an angle of inclination of 45° to 90°, depending upon the consistency of the contents.

In this connection it is decisively important that the procedure takes place with one wing only and that the container on the inner side is smooth except for a fine roughness which comes from a sand blasting of the surface. The roughness of the surface prevents the butter mass from sticking to the walls. In the beginning of the procedure, the wing serves as a stirring wing during the churning process (when butter is produced) and later during the actual working, the wing serves as a conveying wing. Thus during the rotation of the container, the wing lifts the butter lump from the lower part of the container to the upper part, whereupon the butter lump falls down to the diametrically situated lower part of the container where the smooth surface is free of wings. The butter lump will then be flattened. As the rotation of the container continues, the flattened mass will be caught by the wing and rolled again into a lump which will again be brought to the upper part of the container. This working is repeated during the rotation of the container. This treatment of the butter lump causes the salt to be distributed homogeneously throughout the whole mass of butter and causes the uniform removal of water and sap (brine).

By reason of the fact that the churn is adjustable to different angles even when rotating, it is possible when moving the open end upwardly to gather for the working action all particles which have collected at the ends of the churn and which would otherwise not be properly worked.

The cooling and heating of the hollow wing by means of the media circulating in the passageways 23 and 24 is of great importance for a good churning result.

Another important advantage of the apparatus is that a uniformed product is obtainable even though a large quantity of the mass is worked at the same time in a single large space. Since the procedure can be carried out at atmospheric pressure, the arrangement becomes cheap as compared with apparatus worked under vacuum.

What I claim is:

1. An apparatus for producing butter or the like, comprising in combination a container the walls of which form a body of rotation, said container being provided at the end opposite the bottom with a charge and discharge opening, a cover mounted adjacent to said opening, a support in which said container is mounted for rotation about its longitudinal axis, power means for rotating said container in said support, a frame in which said support is mounted so as to be tiltable about an axis extending transversely to the axis of rotation of the container, means for tilting said support about said axis, a single hollow wing mounted at the inside of the container on the side and bottom walls thereof, the remainder of the walls being in the form of an unimpeded surface of revolution to permit the impact thereon and the unobstructed passage thereover of a lump of butter, the wing projecting radially inwardly from the side wall and extending from the bottom wall of the container towards said charge and discharge opening substantially in parallel with the axis of rotation of the container, whereby the butter lump is conveyed by the wing from a lower portion to a higher portion in the container whereupon it falls down to the diametrically situated lower part of the unimpeded surface of revolution as the container is rotated with the axis of rotation at an angle of from 45° to 90° to a vertical reference axis, a jacket surrounding at least a part of the container to form a closed space therearound, said space being in communication with the hollow space provided in the wing, and means for circulating a cooling or heating medium through said jacket space and said hollow space in the wing.

2. An apparatus as claimed in claim 1 in which said wing is substantially straight.

3. An apparatus as claimed in claim 1 in which the wing is triangular in cross section.

References Cited in the file of this patent

UNITED STATES PATENTS

| Number | Name | Date |
|---|---|---|
| 770,779 | Payne | Sept. 27, 1904 |
| 859,823 | Lillard | July 9, 1907 |
| 886,018 | Sellentine | Apr. 28, 1908 |
| 1,073,945 | Warner | Sept. 23, 1913 |
| 1,212,483 | Heller | Jan. 16, 1917 |
| 1,781,823 | Robbins | Nov. 18, 1930 |
| 1,885,350 | Hoffmann | Nov. 1, 1932 |
| 2,013,359 | Paris | Sept. 3, 1935 |
| 2,098,179 | Devenney | Nov. 2, 1937 |

FOREIGN PATENTS

| Number | Country | Date |
|---|---|---|
| 303,099 | Great Britain | Sept. 19, 1929 |
| 345,169 | Great Britain | Mar. 19, 1931 |
| 376,601 | Great Britain | July 14, 1932 |
| 711,378 | France | June 23, 1931 |
| 101,929 | Sweden | Aug. 5, 1941 |